US 6,677,982 B1

(12) United States Patent
Chen et al.

(10) Patent No.: US 6,677,982 B1
(45) Date of Patent: Jan. 13, 2004

(54) METHOD FOR THREE DIMENSIONAL SPATIAL PANORAMA FORMATION

(75) Inventors: Shoupu Chen, Rochester, NY (US); Lawrence A. Ray, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 360 days.

(21) Appl. No.: 09/686,610

(22) Filed: Oct. 11, 2000

(51) Int. Cl.$^7$ .......................... H04N 7/00; H04N 13/00; H04N 15/00
(52) U.S. Cl. ........................................................ 348/36
(58) Field of Search ............................. 348/36, 37, 38, 348/39, 42, 47, 51, 52; H04N 7/00, 13/00, 15/00

(56) References Cited

U.S. PATENT DOCUMENTS

| | | | | |
|---|---|---|---|---|
| 4,429,328 A | * | 1/1984 | Jones et al. | 348/47 |
| 4,528,587 A | * | 7/1985 | Jones, Jr. | 348/44 |
| 5,396,583 A | * | 3/1995 | Chen et al. | 345/427 |
| 5,539,483 A | * | 7/1996 | Nalwa | 353/94 |
| 5,650,813 A | * | 7/1997 | Gilblom et al. | 348/36 |
| 5,659,323 A | * | 8/1997 | Taylor | 348/159 |
| 5,659,804 A | * | 8/1997 | Keller | 396/20 |
| 6,023,588 A | | 2/2000 | Ray et al. | |
| 6,329,687 B1 | * | 12/2001 | Sobek et al. | 257/314 |
| 6,498,618 B2 | * | 12/2002 | Wilson et al. | 348/47 |

OTHER PUBLICATIONS

Ames et al., Positioning Shapes, *VRML 2.0 Sourcebook*, Second Edition, John Wiley & Sons, pp. 63–75.

Huang et al., Panoramic Stereo Imaging System with Automatic Disparity Warping and Seaming, *Graphical Models and Image Processing*, vol. 60, No. 3, May 1998, pp. 196–208.

Ohta et al., Stereo by Intra– and Inter–Scanline Search Using Dynamic Programming, *IEEE Transactions on Pattern Analysis and Machine Intelligence*, vol. PAMI–7, No. 2, Mar. 1985, pp. 139–154.

Cox, et al., A Maximum Likelihood Stereo Algorithm, *Computer Vision and Image Understanding*, vol. 63, No. 3, May 1996, pp. 542–567.

Szeliski et al., Direct Methods for Visual Scene Reconstruction, *Proceedings, IEEE Workshop on Representation of Visual Scenes*, Jun. 1995, pp. 26–33.

* cited by examiner

Primary Examiner—Nhon Diep
(74) Attorney, Agent, or Firm—Stephen H. Shaw

(57) ABSTRACT

A method, a system, and a computer program product for deriving a three-dimensional panorama from a plurality of stereo image pairs of a scene generated from a plurality of cameras, that includes acquiring a plurality of stereo image pairs of the scene, wherein there is an intra-overlap region between vertically aligned stereo image pairs; acquiring a plurality of stereo image pairs of the scene by rotating the plurality of cameras about a Y-axis, wherein there is an inter-overlap region between adjacent stereo image pairs; providing displacement data for capturing scene depth from a local XYZ image with non-distorted depth information; generating (X,Y,Z) values for each of the stereo image pairs with respect to a local three-dimensional coordinate system wherein the intra-stereo image pair is taken; selecting a reference three-dimensional world coordinate system against which spatial information of the scene can be correctly presented; transforming the generated (X,Y,Z) values from each of the local three-dimensional coordinate systems to the selected reference three-dimensional world coordinate system; warping the transformed (X,Y,Z) images onto a cylindrical surface, and forming a plurality of warped (X,Y,Z) images; registering adjacent warped (X,Y,Z) images; and forming a three-dimensional panorama, i.e., a (X,Y,Z) panorama using the warped (X,Y,Z) images.

14 Claims, 4 Drawing Sheets

METHOD FOR THREE DIMENSIONAL SPATIAL PANORAMA FORMATION

FIELD OF THE INVENTION

The invention relates generally to the field of panoramic imaging technology, and in particular to the field of forming a complete three-dimensional panoramic scene.

BACKGROUND OF THE INVENTION

Panoramic imaging technology has been used for merging multiple photographs or digital images to produce a single seamless 360° panoramic view of a particular scene. A single photographic camera is usually employed in such a way that a sequence of image inputs is obtained as the camera is rotated around the focal point of the camera lens causing every two neighboring images to slightly overlap each other. The intensity values from the two neighboring images in the overlap region are weighted and then summed to form a smooth transition. The resultant panorama provides a 2D (two-dimensional) description of the environment.

There is a wide range of potential applications that requires not only intensity panorama but also panoramic three-dimensional (3D) maps associated with the intensity images, that is, a 3D description of the environment. VR technology and e-commerce are example applications where 3D panorama plays a crucial role. Virtual world and virtual objects can be built using the 3D panorama and displayed with the help of VRML (Virtual Reality Modeling Language); see Ames et al., *VRML 2.0 Sourcebook*, Second Edition, *Positioning Shapes*, Chapter 5, pp. 63–75.

In order to obtain both intensity and 3D panorama, multiple (more than one) cameras are usually utilized in constructing a panoramic 3D imaging system. There have been systems producing depth panoramic images; see Huang et al., *Panoramic Stereo Imaging System with Automatic Disparity Warping and Seaming, Graphical Models and Image Processing*, Vol. 60, No. 3, May 1998, pp. 196–208. This system utilizes a side-by-side camera system in imitating a human viewer. It is known that the panoramic images are best captured when the axis of rotation is at the rear-nodal point of the camera. However, this is impossible by using the side-by-side configuration. One solution displaces the camera vertically such that the line between the rear-nodal points of the cameras is aligned with the rotation axis. The details for vertical stereo camera setup are described in the U.S. Pat. No. 6,023,588 issued Feb. 8, 2000 to Ray et al. entitled Method and Apparatus for Capturing Panoramic Images with Range Data.

The camera set swivels at the nodal point at a constant angular interval and produces intensity images that are used to generate 3D images. Like the conventional two-dimensional panorama formed by stitching two neighboring intensity images together, the three-dimensional panorama is constructed by stitching neighboring 3D images. However, problems arise when two adjacent 3D images in a sequence are merged. The 3D values of an object point measured by the camera system is defined with respect to the local three-dimensional coordinate system that is fixed relative to the stereo camera optical system; see Ohta et al., *Stereo by Intra- and Inter-Scanline Search Using Dynamic Programming, IEEE Transaction on Pattern Analysis and Machine Intelligence*, Vol. PAMI-7, No. 2, March, 1985, pp. 139–154, Cox et al., *A Maximum Likelihood Stereo Algorithm, Computer Vision and Image Understanding*, Vol. 63, No. 3, May 1996, pp. 542–567. The computed 3D values of an object point in the real world space is a function of the orientation of the camera optical axis. Consequently, distortion appears when a sequence of 3D images is used to describe the shape of an object. For instance, a smooth surface object in the three-dimensional space appears as a fragmented smooth surface object after reconstruction, using the untreated 3D images. No systematic methods have been shown to address this problem in panoramic 3D map formation. A similar situation exits in estimating depth from motion. For that problem, Szeliski et al. propose a projective structure approach to estimate depth from frame to frame in *Direct Methods for Visual Scene Reconstruction, Proceedings, IEEE Workshop on Representation of Visual Scenes*, Jun. 24, 1995, Cambridge, Mass., pp. 26–33. The approach performs the depth computation for successive images in the projective space rather than the Euclidean space. The obtained depth is thus the projective depth and has to be transformed to the Euclidean coordinate system for practical use. Reliability of this approach is also subject to examination, as noted by the authors.

SUMMARY OF THE INVENTION

The need is met according to the present invention by providing a method, a system, and a computer program product for deriving a three-dimensional panorama from a plurality of stereo image pairs of a scene generated from a plurality of cameras, that includes acquiring a plurality of stereo image pairs of the scene, wherein there is an intra-overlap region between vertically aligned stereo image pairs; providing disparity data for recovering scene spatial information; generating (X,Y,Z) values for each of the stereo image pairs with respect to a local three-dimensional coordinate system wherein the intra-stereo image pair is taken; acquiring a plurality of stereo image pairs of the scene by rotating the plurality of cameras about a Y-axis (vertical axis), wherein there is an inter-overlap region between adjacent stereo image pairs; selecting a reference three-dimensional world coordinate system against which the overall spatial information of the scene can be correctly presented; transforming the generated (X,Y,Z) values from each of the local three-dimensional coordinate systems to the selected reference three-dimensional world coordinate system; warping the transformed (X,Y,Z) images onto a cylindrical surface, and forming a plurality of warped (X,Y,Z) images; registering adjacent warped (X,Y,Z) images; and forming a three-dimensional panorama, i.e., a (X,Y,Z) panorama using the warped (X,Y,Z) images.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
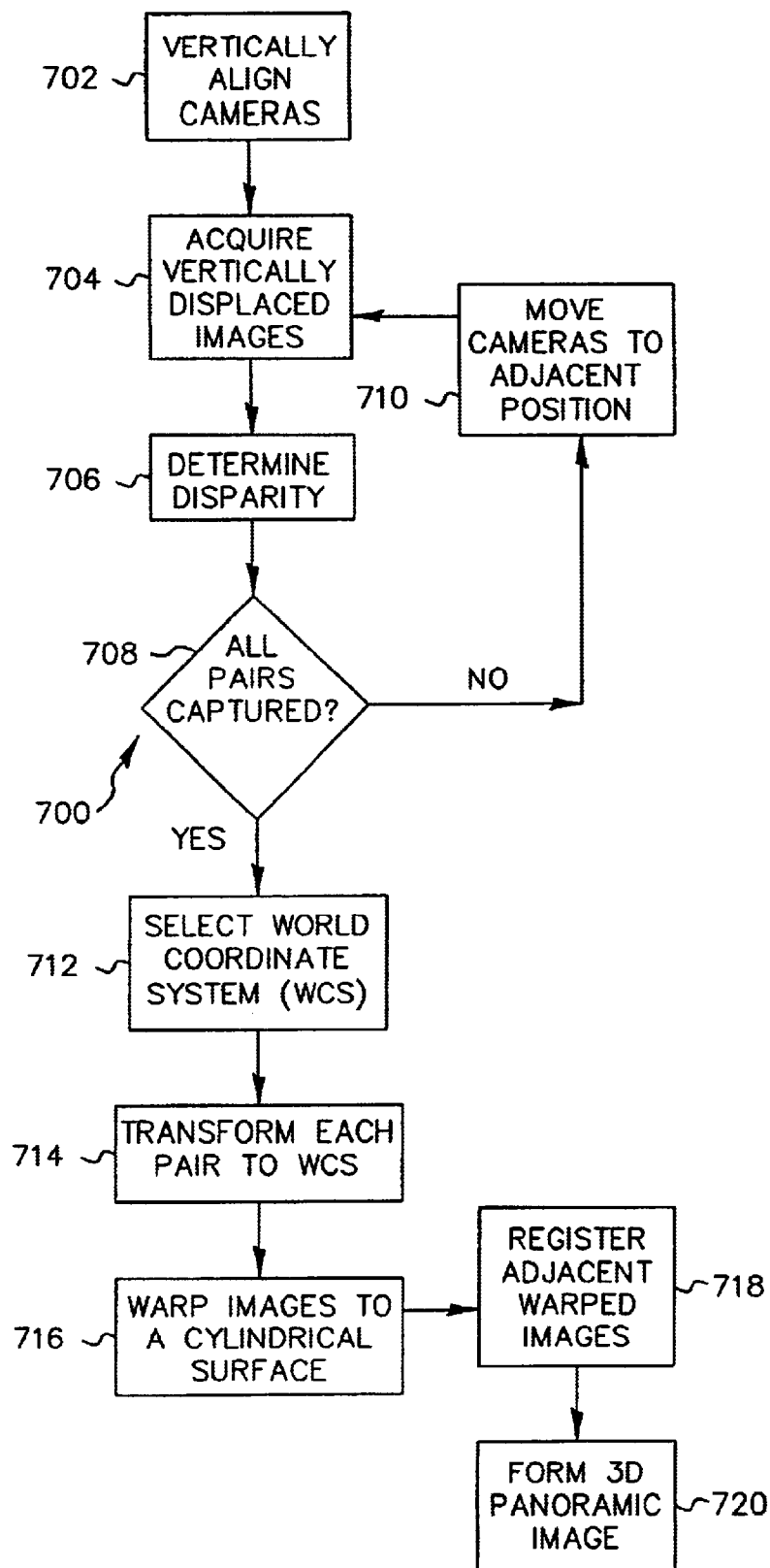
FIG. 1 describes the steps taken in the formation of a three-dimensional panorama with color texture mapped for graphics displaying.

Depicted in FIG. 1 is a computer vision/image processing method 700 for deriving a three-dimensional panorama from a plurality of stereo image pairs of a scene generated from a plurality of cameras, including the steps vertically aligning cameras to produce stereo image pairs 702, acquiring vertically displaced images 704, determining disparity 706, capturing all image pairs 708, moving cameras to adjacent position 710, selecting a world coordinate system 712, transforming each pair to the world coordinate system 714, warping images to a cylindrical surface 716, registering adjacent warped images 718, and forming 3D panoramic image 720.

The computer vision/image processing method 700 forms a complete three-dimensional scene panorama for virtual reality visualization. The method 700 uses a plurality of stereo pairs of intensity images, e.g. (R,G,B) in step 702 of a scene. A plurality of corresponding spatial images, e.g. (X,Y,Z) images in step 704 are estimated with respect to local three-dimensional coordinate systems in step 706 based on the plurality of pairs of intensity images. An inquiry of whether all pairs have been captured is performed by step 708. A negative response to the inquiry causes the vertically aligned cameras to move to an adjacent position in step 710. An arbitrary reference three-dimensional world coordinate system is established in step 712 to uniquely describe the spatial property of the scene captured. All the estimated spatial images are transformed in step 714 to the reference three-dimensional world coordinate system with a homogeneous transformation matrix that is constructed based on the information of the capturing device. The transformed spatial images are stitched together to form a spatial panorama after a cylindrical warping procedure 716 and a registration process 718. Likewise, the intensity images are stitched together to form an intensity panorama in step 720 after the same procedures. Both spatial and intensity panoramas are used in virtual display with no further transformation operation needed.

Figure 2:
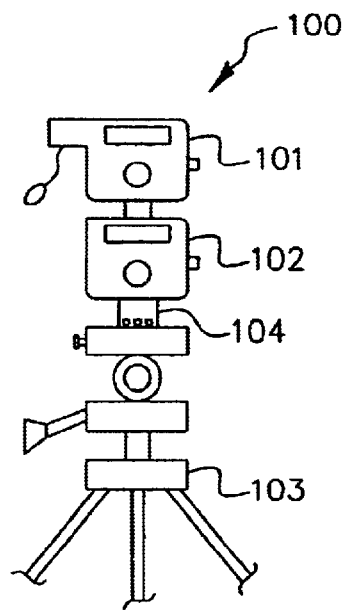
FIG. 2 is a side view showing a stereo camera set assembly arrangement which is constructed to acquire two series of images spanning the desired environment.

FIG. 2 shows a image acquisition assembly 100, that includes a pair of cameras 101 (upper camera) and 102 (lower camera); a tripod 103, and a vertical rotating axis 104. In operation, the pair of stereo cameras 101 and 102 are mounted on the tripod 103. The camera pair is rotatable around the vertical axis 104 that is rigidly attached to the tripod 103. As shown in FIG. 2, the stereo cameras are displaced vertically as opposed to the traditional horizontal displacement arrangement. The vertical axis 104 is at the nodal points of cameras 101 and 102. A pair of images (upper and lower images) is obtained at a particular angle as the camera pair rotates around the vertical axis. A sequence of pairs of images results when the cameras complete a 360° rotation. The cameras are rotated such that the successive stereo image pairs overlap (in a horizontal direction) with each other. Many pairs of images are possible. One of the two images (upper or lower image) is used to form the (R,G,B) image series 305. Both images (upper and lower images) are used to estimate the (X,Y,Z) image series 306 that describe the spatial property of the environment filmed.

Figure 3:
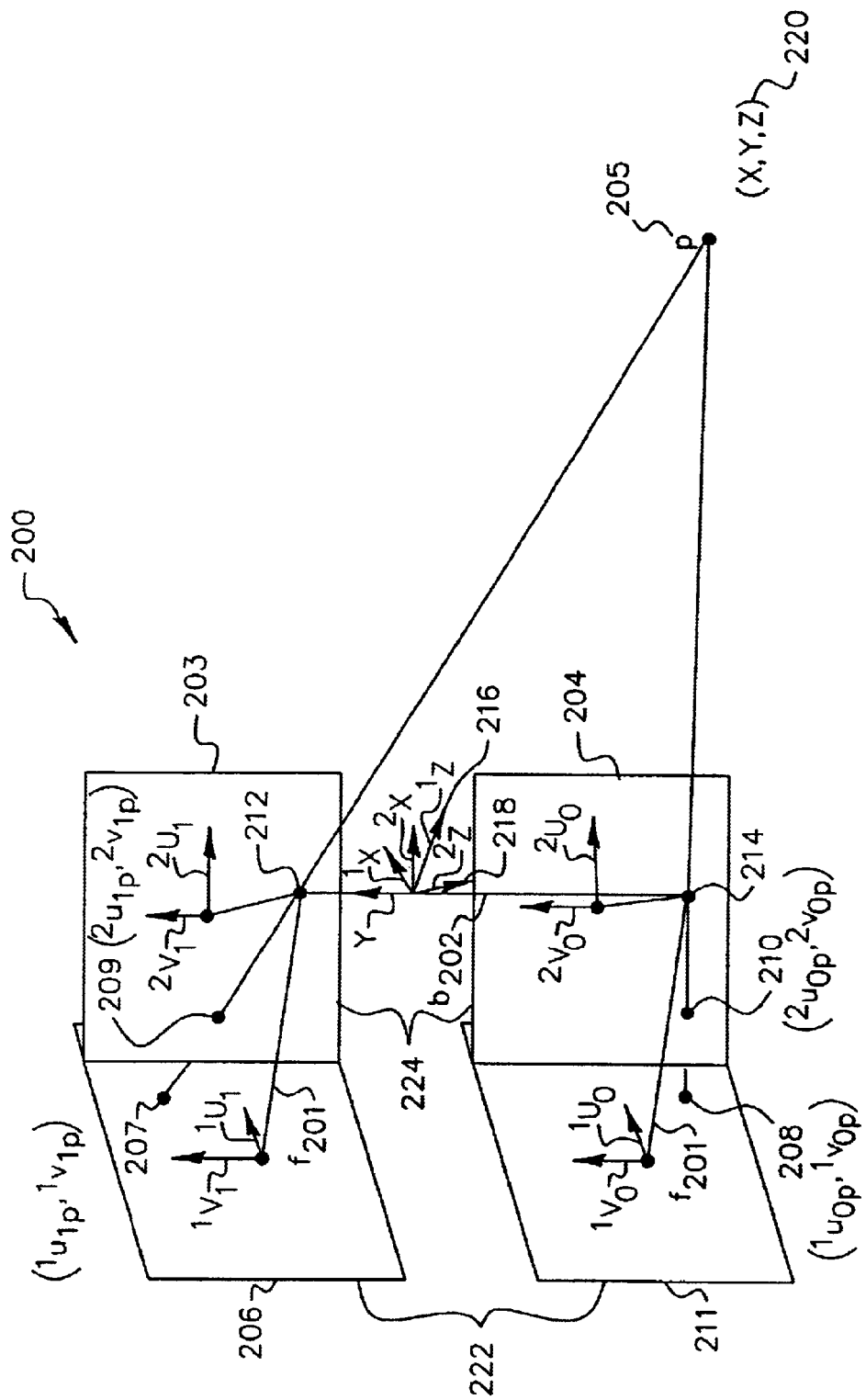
FIG. 3 depicts a 3D point p being projected onto two neighboring stereo-image two-dimensional planes that are attached with corresponding local three-dimensional coordinate systems.

FIG. 3 depicts a stereo optical system 200 and includes an image focal length 201, a stereo displacement 202, an upper image plane 203, a lower image plane 204, an arbitrary point in 3D space 205, an upper image plane 206, an example pixel 207 for upper image, an example pixel 208 for lower image, an example pixel 209 for upper image, an example pixel 210 for lower image, a lower image plane 211, an upper images focal point 212, a lower images focal point 214, a local 3D coordinate system 216, a local 3D coordinate system 218, XYZ coordinates 220 for arbitrary point 205, a stereo image pair 222, and a stereo image pair 224.

In operation and referring to FIG. 3, because there is no horizontal displacement of upper/lower image pairs, the pixel 207 on a given column of the upper image 206 is correspondingly matched with pixel 208 on the same column of the lower image 211. The stereo pair generated from the camera pair is constructed in such a way that it produces two images, the upper image and the lower image. These two images have an intra-pair overlap region wherein the corresponding points of the two images can be found. For example, pixels 207 and 208 optically reside in an intra-pair overlap region between the two images. Numerous matched pixels between the two images form spatial (XYZ) images for the scene. The disparity data between pixels 207 and 208 will generate X,Y,Z values for the 3-dimensional point 205 with respect to the local coordinate system 216.

Likewise, pixels 209 and 210 reside in an intra-pair overlap region between the upper and lower images. Numerous matching pixels between the two images form spatial (XYZ) images for the scene. The disparity data between pixels in image planes 203 and 204 will generate X,Y,Z values for the 3-dimensional point 205 with respect to the local coordinate system 218. While image correspondence can be established in a variety of ways, including the algorithms described in the aforementioned Ohta et al. and Cox et al papers, the preferred technique is described in co-pending U.S. Ser. No. 09/382,451, filed Aug. 25, 1999. If exact correspondence can be established, the disparity d between the location of pixels, e.g., points 207 and 208, on each image can be used to compute the (X,Y,Z) 220 values of a real world point 205. In fact, the relationship between the disparity d and the (X,Y,Z) values can be given by:

$$X = b\frac{u_0 + u_1}{2d} \quad \text{Eq. 1}$$

$$Y = b\frac{v_0 + v_1}{2d} \quad \text{Eq. 2}$$

$$Z = fb/d \quad \text{Eq. 3}$$

where $d=v_0-v_1$, b is the baseline 202 between focal points 212 and 214, and f is the focal length 201. Persons skilled in the art will recognize that non-distorted depth information will be obtained by using Equation 3. Using Equations 1 and 2, additional X and Y information can be generated for 3-dimensional point 205.

It should be noted that Equations 1, 2 and 3 are valid for a local three-dimensional coordinate system only. That is, for image pair 206 and 207, the (X,Y,Z) values are computed with respect to local three-dimensional coordinate system $^1XY^1Z$ 216; for image pair 203 and 204, the 3D values are computed against coordinate system $^2XY^2Z$. If a panoramic image sequence is composed with N pairs of images, there will be N different three-dimensional coordinate systems with respect to which the (X,Y,Z) values are computed.

Figure 4:
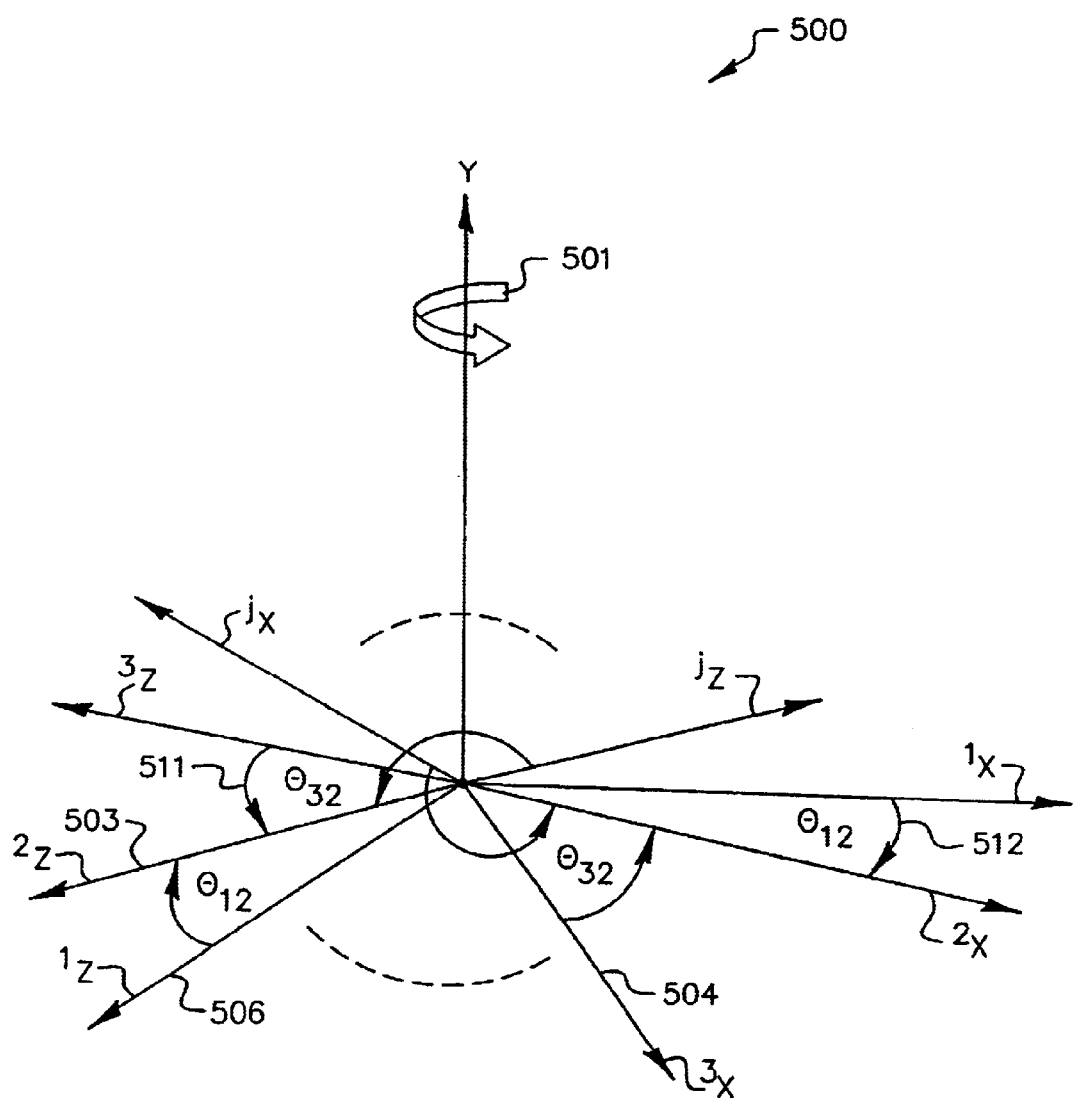
FIG. 4 illustrates the transformation of the reconstructed 3D data from each of the individual three-dimensional system determined by the stereo-camera head orientation to a common reference three-dimensional coordinate system.

FIG. 4 includes, an example coordinate system transformation 500, a rotation direction 501, a reference coordinate system 503, a pre-transformation (A) coordinate system 504, a pre-transformation (B) coordinate system 506, an angle 511 between coordinate systems 504 and 503, an angle 512 between coordinate systems 506 and 503.

Figure 5:
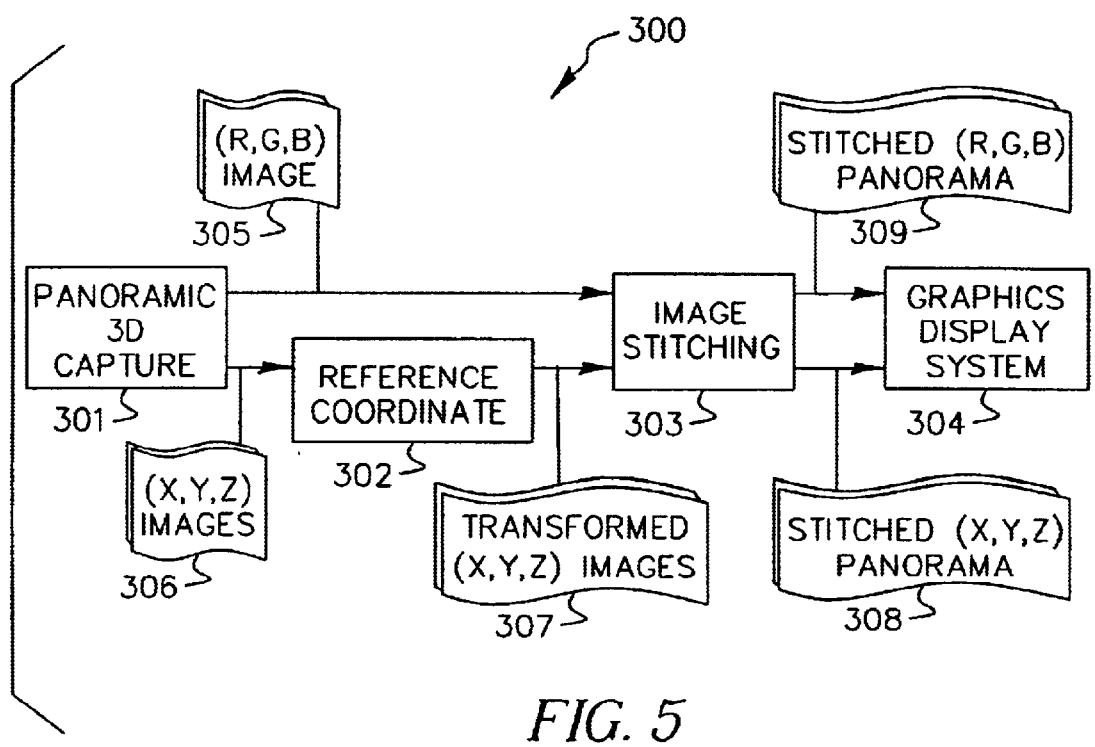
FIG. 5 shows a three-dimensional panoramic imaging system according to the present invention.

FIG. 5 shows a three-dimensional panoramic imaging system 300, including a panoramic 3D capturing system 301, a reference coordinate system 302, an image stitching system 303, a graphics display system 304, a plurality of intensity (R,G,B) images 305, a plurality of spatial (X,Y,Z) images, a sequence of transformed images 307, a stitched spatial panorama 308, and a stitched intensity panorama 309.

In operation the three-dimensional panoramic imaging system 300 enables the 3D panoramic capturing system 301 to produce a sequence of three-dimensional (X,Y,Z) images 306 as well as a sequence of (R,G,B) images 305. In accordance with the present invention, each of the (X,Y,Z) images in the captured sequence is transformed to a common three-dimensional coordinate system 302 from its local three-dimensional coordinate system at which the corresponding (R,G,B) image is taken and the original (X,Y,Z) image is computed. The transformed (X,Y,Z) images in a sequence are stitched together in the image stitching system 303 producing a stitched (X,Y,Z) panorama 308. The intensity (R,G,B) images are stitched together in the image stitching system 303 producing a (R,G,B) panorama 309. The stitched (X,Y,Z) panorama 308 and (R,G,B) panorama 309 are fed to a graphics display system 304 to generate a virtual world.

The panoramic 3D capturing system employs the preferred method of capturing stereo image pairs described in the aforementioned U.S. Pat. No. 6,023,588, i.e. an imaging system wherein two series of images spanning the desired environment are captured. These stereo image pairs are intra-overlapped as shown by FIG. 3.

In accordance with the present invention, a common reference three-dimensional coordinate system (i.e. a world coordinate system) is arbitrarily selected, all the (X,Y,Z) values computed for all the image pairs are transformed from their original local three-dimensional coordinate system to the selected world coordinate system. As an example, referring to FIG. 4, the coordinate system $^2XY^2Z$ 503 is chosen as the world coordinate system, all data computed are then transformed to the world coordinate system with the method described below.

For example, denote a three-dimensional point in local coordinate system j by $$^jP = [^jX_p, ^jY_p, ^jZ_p, 1]$$  Eq. 4 then the homogeneous transformation from local coordinate system j to world coordinate system i can be represented by $$^iP = [T^i_j]^jP$$  Eq. 5

For cases as shown in FIG. 4 where only rotation about the Y axis exits then the transformation matrix $$T^i_j = \begin{bmatrix} \cos(\theta_{ji}) & 0 & -\sin(\theta_{ji}) & 0 \\ 0 & 1 & 0 & 0 \\ \sin(\theta_{ji}) & 0 & \cos(\theta_{ji}) & 0 \\ 0 & 0 & 0 & 1 \end{bmatrix}$$  Eq. 6 where $\theta_{ji}$ is the rotation angle from local coordinate system j to world coordinate system i about the Y axis. For a more general homogenous transformation matrix $$T^i_j = \begin{bmatrix} t_{11} & t_{12} & t_{13} & t_{14} \\ t_{21} & t_{22} & t_{23} & t_{24} \\ t_{31} & t_{32} & t_{33} & t_{34} \\ 0 & 0 & 0 & 1 \end{bmatrix}$$  Eq. 7 where $t_{11} = \cos(\theta_{ji})\cos(\kappa_{ji})$ $t_{12} = \sin(\omega_{ji})\sin(\theta_{ji})\cos(\kappa_{ji}) + \cos(\omega_{ji})\sin(\kappa_{ji})$ $t_{13} = -\cos(\omega_{ji})\sin(\theta_{ji})\cos(\kappa_{ji}) + \sin(\omega_{ji})\sin(\kappa_{ji})$ $t_{21} = -\cos(\theta_{ji})\sin(\kappa_{ji})$ $t_{22} = -\sin(\omega_{ji})\sin(\theta_{ji})\sin(\kappa_{ji}) + \cos(\omega_{ji})\cos(\kappa_{ji})$  Eq. 8

$t_{23} = \cos(\omega_{ji})\sin(\theta_{ji})\sin(\kappa_{ji}) + \sin(\omega_{ji})\cos(\kappa_{ji})$ $t_{31} = \sin(\theta_{ji})$ $t_{32} = -\sin(\omega_{ji})\cos(\theta_{ji})$ $t_{33} = \cos(\omega_{ji})\cos(\theta_{ji})$ $t_{14} = x_{ji}$ $t_{24} = y_{ji}$ $t_{34} = z_{ji}$ where $\theta_{ji}$ is the rotation angle from local coordinate system j to world coordinate system i about the Y axis, $\omega_{ji}$ is the rotation angle about the X axis, $\kappa_{ji}$ is the angle about Z axis, $x_{ji}$ is the translation between local coordinate system j and world coordinate system i along X axis, $y_{ji}$ is the translation along Y axis, and $z_{ji}$ is the translation along Z axis.

It should be pointed out that all coordinate systems are defined as right-handed, i.e. a system in which positive X, Y, and Z are defined as shown in FIG. 3. Rotation angles $\omega$, $\theta$, and $\kappa$ are defined positive if they are counterclockwise when viewed from the positive end of their respective axes. Positive rotation angle $\theta$ for example, is shown in FIG. 4 as $\theta_{32}$ 511 for transforming coordinate system $^3XY^3Z$ 504 to coordinate system $^2XY^2Z$ 503. While $\theta_{12}$ 512 is negative since the transformation is made from coordinate system $^1XY^1Z$ 506 to coordinate system $^1XY^1Z$ 503, which presents a clockwise rotation. Arrow 501 indicates the counter clock wise rotation.

After applying the above example homogenous transformation to each of the (X,Y,Z) images 306 generated from the panoramic 3D capturing system 301, a sequence of transformed (X,Y,Z) images 307 from each of the local three-dimensional coordinate systems to the selected reference three-dimensional world coordinate system is produced. The sequence of transformed (X,Y,Z) images ready is stitched together in image stitch block 303 where the sequence of (R,G,B) images is also stitched. Since images are a perspective projection of real world objects onto a plane, an inherent distortion exists. In order to remove this distortion and keep sizes of objects consistent between the inter-pair images, the (R,G,B) and corresponding transformed (X,Y,Z) images must be first warped from a planar surface to another domain such as a cylindrical surface. Thus a plurality of warped images may be formed. Then, a registration procedure is taken to determine the specific point (registration point) where adjacent (inter-pair) warped images overlap. Once registration points have been identified, adjacent sets of overlapping cylindrically warped (R,G,B) images can be stitched together to form a (R,G,B) panorama 309. Likewise, adjacent sets (inter-pair) of overlapping cylindrically warped (X,Y,Z) images can be stitched together to form a (X,Y,Z) panorama 308. The preferred registration, warping and stitching techniques are described in co-pending U.S. Ser. No. 09/383,573, filed Aug. 25, 1999.

Both (R,G,B) and (X,Y,Z) panoramas are then input to the graphics display system 304, such as the aforementioned VRML system, for visualization.

The present invention is preferably practiced in an image processing system including a source of digital images, such as a scanner; a computer programmed to process digital images; and an output device such as a graphics display device, a thermal printer, or an inkjet printer. The method of the present invention may be sold as a computer program product including a computer readable storage medium bearing computer code for implementing the steps of the invention. Computer readable storage medium may include, for example: magnetic storage media such as a magnetic disc (e.g. a floppy disc) or magnetic tape; optical storage media such as optical disc or optical tape; bar code; solid state electronic storage devices such as random access memory (RAM) or read only memory (ROM); or any other physical device or medium employed to store a computer program.

The invention has been described with reference to a preferred embodiment. However, it will be appreciated that variations and modifications can be effected by a person of ordinary skill in the art without departing from the scope of the invention.

PARTS LIST

- 100 image acquisition assembly
- 101 upper camera
- 102 lower camera
- 103 tripod
- 104 vertical rotating axis
- 200 stereo optical system
- 201 image focal length
- 202 stereo displacement
- 203 upper image plane @ α
- 204 lower image plane @ α
- 205 arbitrary point in 3D space
- 206 upper image plane @ β
- 207 example pixel for upper image @ β
- 208 example pixel for lower image @ β
- 209 example pixel for upper image @ α
- 210 example pixel for lower image @ α
- 211 lower image plane @ β
- 212 upper images focal point
- 214 lower images focal point
- 216 local 3D coordinate system @ β
- 218 local 3D coordinate system @ α
- 220 XYZ coordinates for arbitrary point 205
- 222 stereo image pair @ α
- 224 stereo image pair @ β
- 300 three-dimensional panoramic imaging system
- 301 3D capturing system
- 302 3D reference coordinate system
- 303 image stitching system
- 304 graphics display system
- 305 intensity (RGB) image sequence
- 306 spatial (XYZ) image sequence
- 307 transformed spatial (XYZ) image sequence
- 308 stitched spatial (XYZ) panorama
- 309 stitched intensity (RGB) panorama
- 500 example coordinate system transformation
- 501 rotation direction
- 503 reference coordinate system
- 504 pre-transformation coordinate system (A)
- 506 pre-transformation coordinate system (B)
- 511 angle between 504 and 503
- 512 angle between 506 and 503
- 700 flowchart for a computer vision/image processing method
- 702 vertical camera alignment step
- 704 acquisition of vertical displaced images step
- 706 determining disparity step
- 708 capturing all pairs inquiry step
- 710 adjacent repositioning step
- 712 selecting WCS
- 714 transforming to WCS
- 716 warping image
- 718 registering warped images
- 720 forming 3D panoramic image

What is claimed is:

1. A method for deriving a three-dimensional panorama from a plurality of stereo image pairs of a scene generated from a plurality of cameras, the method comprising the steps of:

(a) acquiring a plurality of stereo image pairs of the scene, wherein there is an intra-overlap region between vertically aligned stereo image pairs;

(b) acquiring a plurality of stereo image pairs of the scene by rotating the plurality of cameras about a Y-axis (vertical axis), wherein there is an inter-overlap region between adjacent stereo image pairs;

(c) providing disparity data for every pair (intra-pair) of stereo images to recover scene spatial information (X,Y,Z) with respect to local XYZ coordinate systems;

(d) selecting a reference three-dimensional world coordinate system against which spatial information of the scene can be correctly presented;

(e) transforming the scene spatial information (X,Y,Z) values from each of the local three-dimensional coordinate systems to the selected reference three-dimensional world coordinate system;

(f) warping the transformed (X,Y,Z) images onto a cylindrical surface, and forming a plurality of warped (X,Y,Z) images;

(g) registering adjacent warped (X,Y,Z) images; and (h) forming a three-dimensional panorama, i.e., a (X,Y,Z) panorama using the warped (X,Y,Z) images.

2. The method claimed in claim 1, and the step of providing disparity data further comprises:

(i) detecting corresponding image pixels in a stereo image pair;

(ii) fixing the local three-dimensional coordinate system relative to the stereo two-dimensional coordinate systems such that image pixels are defined.

3. The method as claimed in claim 1, wherein the three dimensional panorama is in color.

4. The method claimed in claim 1, wherein the reference three-dimensional world coordinate system is an arbitrary three-dimensional coordinate system.

5. The method claimed in claim 4 and further comprising the step of selecting the reference three-dimensional world coordinate system from the local three-dimensional coordinate systems or a three-dimensional coordinate system defined elsewhere.

6. The method claimed in claim 1 wherein step (e) of transforming the scene spatial information (X,Y,Z) values comprises forming a homogeneous transformation matrix.

7. A three-dimensional panoramic system for producing a sequence of spatial (X,Y,Z) images from stereo pairs of intensity (R,G,B) images, comprising:

(a) a panoramic three-dimensional capturing component for acquiring a plurality of stereo (X,Y,Z) image pairs of the scene, wherein there is an overlap region between adjacent stereo (X,Y,Z) image pairs;

(b) a reference coordinate component for warping the (X,Y,Z) image pixels onto a cylindrical surface, and a plurality of warped (X,Y,Z) images, including means for registering one or more common pixels in the overlap regions of the adjacent warped (X,Y,Z) image;

(c) an image stitching component for stitching the overlap regions of a registered warped (X,Y,Z) image to generate a (X,Y,Z) panorama; and (d) a graphics display for visually displaying the (X,Y,Z) panorama.

8. A three-dimensional panoramic image homogenous system, comprising:

a three-dimensional panoramic capturing system, wherein a sequence of spatial (X,Y,Z) images and a sequence of intensity (R,G,B) images are produced;

a reference coordinate transformation system such that each of the spatial images is transformed to a common three-dimensional coordinate system from its local three-dimensional coordinate system at which the corresponding intensity image is taken and the original spatial image is computed;

an image stitching system that produces a stitched spatial panorama, from the transformed spatial images, and a stitched intensity panorama from the sequence of intensity images; and a graphics display system for receiving the stitched spatial and intensity panoramas, and generating a virtual world reality.

9. A computer program product for constructing a complete 3-D panorama from at least two scene images, comprising: a computer readable storage medium having a computer program stored thereon for performing the steps of:

(a) acquiring a plurality of stereo image pairs of the scene, wherein there is an intra-overlap region between vertically aligned stereo image pairs;

(b) acquiring a plurality of stereo image pairs of the scene by rotating the plurality of cameras about a Y-axis (vertical axis), wherein there is an inter-overlap region between adjacent stereo image pairs;

(c) providing disparity data for every pair (intra-pair) of stereo images to recover scene spatial information (X,Y,Z) with respect to local XYZ coordinate systems;

(d) selecting a reference three-dimensional world coordinate system against which spatial information of the scene can be correctly presented;

(e) transforming the scene spatial information (X,Y,Z) values from each of the local three-dimensional coordinate systems to the selected reference three-dimensional world coordinate system;

(f) warping the transformed (X,Y,Z) images onto a cylindrical surface, and forming a plurality of warped (X,Y,Z) images;

(g) registering adjacent warped (X,Y,Z) images; and (h) forming a three-dimensional panorama, i.e., a (X,Y,Z) panorama using the warped (X,Y,Z) images.

10. A computer program product as claimed in claim 9, wherein recovering scene spatial information (X,Y,Z) values comprises:

(i) detecting corresponding image pixels in a stereo image pair;

(ii) fixing the local three-dimensional coordinate system relative to the stereo two-dimensional coordinate systems where image pixels are defined.

11. A computer program product as claimed in claim 9, comprising generating a complete panoramic scene panorama containing both (R,G,B) and (X,Y,Z) panoramas.

12. A computer program product as claimed in claim 9, wherein the reference three-dimensional world coordinate system is an arbitrary three-dimensional coordinate system.

13. A computer program product as claimed in claim 12, further comprises selecting the reference three-dimensional world coordinate system from the local three-dimensional coordinate systems or a three-dimensional coordinate system defined elsewhere.

14. A computer program product as claimed in claim 9, wherein step (e) of transforming the scene spatial information (X,Y,Z) values comprises forming a homogeneous transformation matrix.

* * * * *